(12) United States Patent
Matsumoto (10) Patent No.: US 9,746,858 B2
(45) Date of Patent: Aug. 29, 2017

(54) CONTROL DEVICE FOR AUTOMATICALLY STARTING WARM-UP

(71) Applicant: FANUC CORPORATION, Minamitsuru-gun, Yamanishi (JP)

(72) Inventor: Kaname Matsumoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 408 days.

(21) Appl. No.: 14/518,534

(22) Filed: Oct. 20, 2014

(65) Prior Publication Data

US 2015/0112503 A1     Apr. 23, 2015

(30) Foreign Application Priority Data

Oct. 22, 2013   (JP) ................................. 2013-219633

(51) Int. Cl.
| B23Q 11/00 | (2006.01) |
| G05B 19/404 | (2006.01) |
| G05D 23/19 | (2006.01) |
| G05B 15/02 | (2006.01) |

(52) U.S. Cl.
CPC .......... *G05D 23/19* (2013.01); *B23Q 11/0003* (2013.01); *G05B 15/02* (2013.01); *G05B 19/404* (2013.01); *G05D 23/1951* (2013.01); *G05B 2219/49219* (2013.01)

(58) Field of Classification Search
CPC ............... G05D 23/19; G05D 23/1951; B23Q 5819/404; G05B 15/02; G05B 19/404; G05B 2219/49219

USPC ......................................................... 700/299
See application file for complete search history.

(56) References Cited

U.S. PATENT DOCUMENTS

| 5,426,861 A * | 6/1995 | Shelton ................ G01B 21/045 33/502 |
| 2003/0185559 A1* | 10/2003 | Yoshida ............... G03D 15/022 396/571 |
| 2013/0211598 A1 | 8/2013 | Fujii | |

FOREIGN PATENT DOCUMENTS

| CN | 102101353 | 6/2011 |
| DE | 102010001518 | 8/2011 |
| JP | 02279254 | 11/1990 |
| JP | 05144249 | 6/1993 |
| JP | 2010105101 | 5/2010 |
| JP | 2013163255 | 8/2013 |
| JP | 2013202741 | 10/2013 |

* cited by examiner

*Primary Examiner* — Robert Fennema
*Assistant Examiner* — Jigneshkumar Patel
(74) *Attorney, Agent, or Firm* — RatnerPrestia (57) ABSTRACT

A control device of the present invention estimates warm-up time that it takes for a warm-up of a machine based on the temperature of the machine to be warmed up and the saturation temperature that is unique to the machine. Warm-up start time is calculated based on the obtained warm-up time and predefined warm-up end time. In this way, the warm-up can be efficiently performed as the warm-up can be performed for an appropriate period of time in consideration of the saturation temperature unique to the machine.

4 Claims, 6 Drawing Sheets

CONTROL DEVICE FOR AUTOMATICALLY STARTING WARM-UP

BACKGROUND ART

1. Field of the Invention

The present invention relates to a control device that controls warm-up of a machine.

2. Description of the Related Art

Warm-up is carried out in machines that need to operate in high accuracy, in order to stabilize the operational accuracy or operational results of the machines. The warm-up is intended to prevent the operational accuracy of a machine from being affected by stretched and contracted drive elements of the machine caused by temperature change during machine operation. In general, the drive elements of the machine are expanded as the temperature of the drive elements of the machine rises, which generates a difference between behavior (e.g., operation paths) of the drive elements of the machine with relatively low temperature immediately after starting the operation and behavior of the drive elements of the machine that has been sufficiently warmed up. As a result, stable operational accuracy of the machine is not assured from starting the operation until the machine is sufficiently warmed up.

As a general rule, a warm-up is preferably completed before performing an intended regular operation (machining, when the machine is a machine tool). However, there is a possibility that performing the warm-up may result in a reduction of the actual operation time, thereby lowering product efficiency. In other cases, when an operator carries out the warm-up outside working hours, labor costs increase accordingly.

JP-A-2013-163255 discloses a warm-up control device that is configured to automatically perform a warm-up even when a machine tool has been left alone after a warm-up stopped. Further, the control device disclosed in JP-A-2013-163255 is configured to determine whether or not to perform the warm-up again based on a thermal displacement amount that changes over time.

JP-A-2010-105101 discloses an electric discharge machining device that is configured to allow an operator to immediately start a machining task at task start time. In the electric discharge machining device described in JP-A-2010-105101, unnecessary power consumption is intentionally reduced by switching between a normal mode and a power-saving mode. The switching between the modes is performed at a preset time.

However, while the preparation process of a machine may be automatically performed at predetermined start time, the electric discharge machining device described in JP-A-2010-105101 needs a device that circulates machining liquid outside the machine in order to prevent thermal displacement of the constituent portions, which increases costs for the machine. In addition, configuration for circulating the machining liquid through the drive elements (e.g., ball screws and the like) of the machine as a control object is complicated and, thus, such configuration is difficult to realize. Therefore, there is a need for a control device with a low-cost and simple configuration, which can automatically and efficiently perform a warm-up without need of additional devices.

SUMMARY OF THE INVENTION

According to a first aspect of the invention of the present application, provided is a control device that controls a warm-up of a machine in accordance with an operation program, the control device includes: a storage unit that stores warm-up end time; a time measurement unit that measures current time; a temperature measurement unit that measures temperature of the machine; and a control unit that controls operation of the machine, and the control unit includes: an estimating unit that estimates warm-up time that it takes for the warm-up of the machine based on a difference between the temperature of the machine that is measured by the temperature measurement unit and saturation temperature that is unique to the machine; a start time determination unit that determines warm-up start time based on the warm-up end time stored in the storage unit and the warm-up time estimated by the estimating unit; a warm-up start unit that starts the warm-up of the machine based on the current time measured by the time measurement unit and the warm-up start time determined by the start time determination unit; and a warm-up end unit that ends the warm-up of the machine when the current time measured by the time measurement unit coincides with the warm-up end time stored in the storage unit.

According to a second aspect of the invention of the present application, in the control device according to the first aspect, the start time determination unit is configured so that the current time measured by the time measurement unit becomes time obtained by subtracting the warm-up time from the warm-up end time.

According to a third aspect of the invention of the present application, in the control device according to the first or second aspect, the warm-up start unit is configured to start the warm-up of the machine when the current time measured by the time measurement unit coincides with the time obtained by subtracting the warm-up time from the warm-up end time.

According to a fourth aspect of the invention of the present application, in the control device according to any one of the first to third aspects, the estimating unit is configured to calibrate the warm-up time in accordance with an operation condition of the machine.

According to a fifth aspect of the invention of the present application, in the control device according to any one of the first to fourth aspects, the control unit further includes a disturbance detection unit that detects generation of a disturbance, and the control unit is configured to change an operation condition of the machine when the disturbance detection unit detects a disturbance.

These and other objectives, features, and advantages of the present invention will become more apparent with reference to the detailed description of exemplary embodiments of the present invention as depicted in the appended drawings.

DETAILED DESCRIPTION OF THE INVENTION

Figure 1:
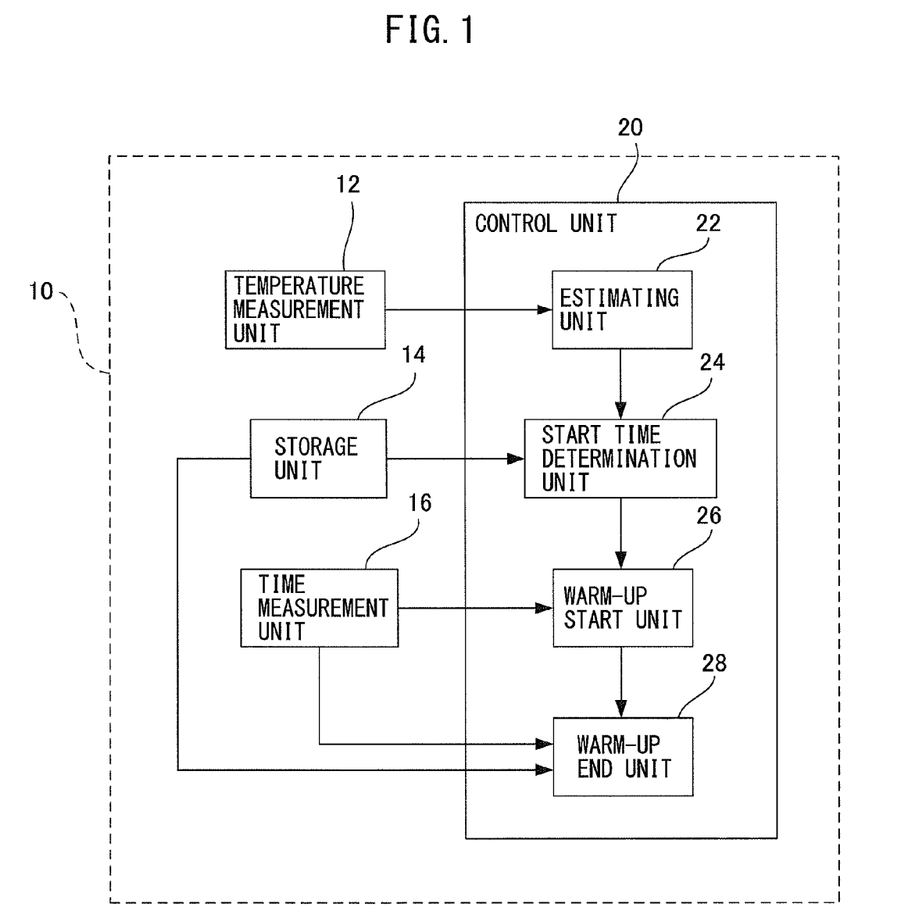
FIG. 1 is a functional block diagram depicting a configuration of a control device according to a first embodiment of the present invention.

The following will describe the embodiments of the present invention with reference to the appended drawings. FIG. 1 is a functional block diagram depicting a configuration of a control device 10 according to a first embodiment of the present invention. The control device 10 is configured to control the warm-up of a machine, for example, a machine tool. The machine that may be controlled by the control device 10 according to the present invention may be a known machine with an arbitrary configuration. In this description, the following will be described by taking an example of the control device 10 that controls the operation of a power system provided for a drive shaft of a machine tool.

The control device 10 has an arbitrary hardware structure configured by a combination of known constituent elements, such as a CPU that executes various arithmetic processing, a RAM that temporarily stores the arithmetic results, a ROM that stores an operation program and the like, a power supply device, and a wired or wireless signal transceiver. Further, the control device 10 is connected to an external device, not depicted, via an interface, which allows desired information to be input to the control device 10 and output from the control device 10 to the external device.

As depicted in FIG. 1, the control device 10 includes a temperature measurement unit 12, a storage unit 14, a time measurement unit 16, and a control unit 20. The control unit 20 further includes an estimating unit 22, a start time determination unit 24, a warm-up start unit 26, and a warm-up end unit 28.

The temperature measurement unit 12 functions to acquire temperature of a machine (including an electric motor or the like) as a control object. The temperature of the machine is detected by, for example, a temperature sensor (not depicted) equipped on the machine. The temperature measurement unit 12 is configured to directly or indirectly acquire the detected value of the temperature sensor.

The storage unit 14 functions to store the time when a warm-up should end (warm-up end time). The warm-up end time is normally defined so as to substantially coincide with the time when a scheduled regular machining process starts. For example, when the machining process needs to start at 8:00 a.m., the warm-up end time is set to 8:00 a.m. at the latest. As necessary, the warm-up end time may be set somewhere around the scheduled start time of the machining process. The warm-up end time may be automatically set according to a schedule that is included in advance in a program, or may be manually input by an operator.

The time measurement unit 16 functions to measure the current time. The time measurement unit 16 may be formed to independently measure the actual time, or acquire the current time by operating in cooperation with external timing means.

The estimating unit 22 functions to estimate time that it takes for completing the warm-up of the machine (warm-up time), based on the temperature of the machine measured by the temperature measurement unit 12 and the saturation temperature that is unique to the machine. A specific example of the estimation method for estimating the warm-up time by the estimating unit 22 will be described later herein.

The function of start time determination unit 24 is to determine time to start the warm-up (warm-up start time), based on the warm-up end time stored in the storage unit 14 and the warm-up time estimated by the estimating unit 22. The warm-up start time may be obtained, for example, by subtracting the warm-up time from the warm-up end time.

The warm-up start unit 26 functions to start the warm-up of the machine based on the current time measured by the time measurement unit 16 and the warm-up start time determined by the start time determination unit 24. The warm-up start unit 26 starts the warm-up of the machine, for example, when the measured current time is within a predetermined range from the warm-up start time.

The warm-up end unit 28 functions to end the warm-up based on the current time measured by the time measurement unit 16 and the warm-up end time stored in the storage unit 14. For example, the warm-up end unit 28 promptly ends the warm-up of the machine when the current time reaches the warm-up end time.

Figure 5:
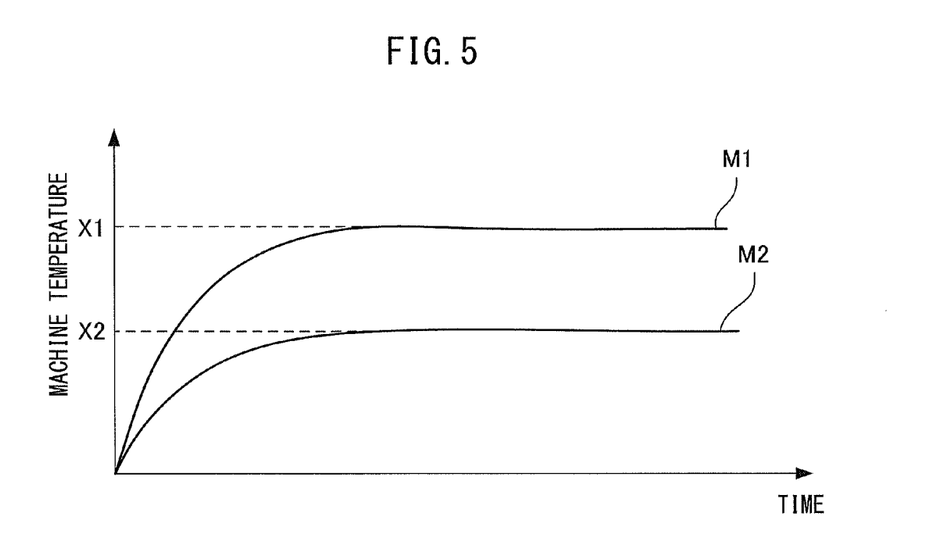
FIG. 5 is a diagram representing the relationship between the temperature and the heat capacity of machines.
Figure 6:
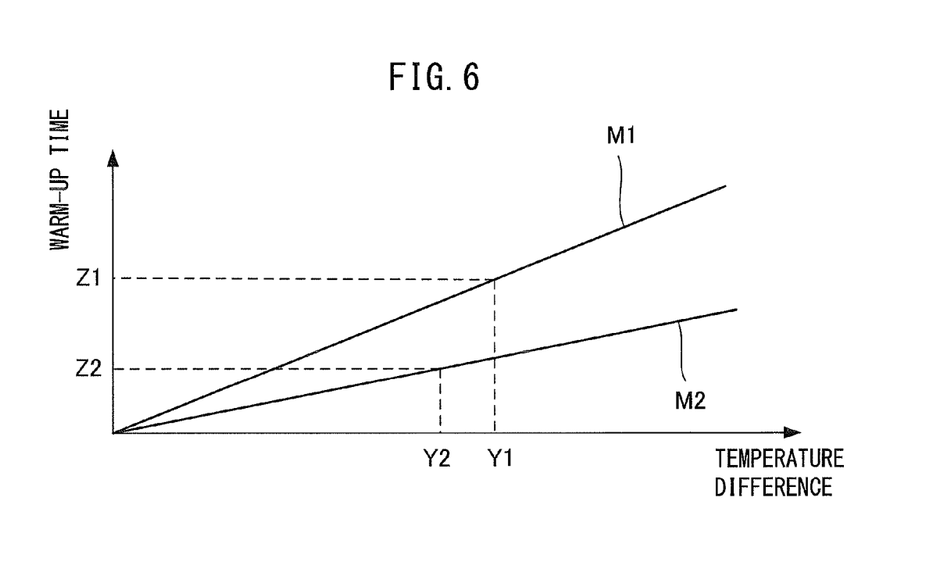
FIG. 6 is a diagram illustrating processing for estimating the warm-up time.
Figure 7:
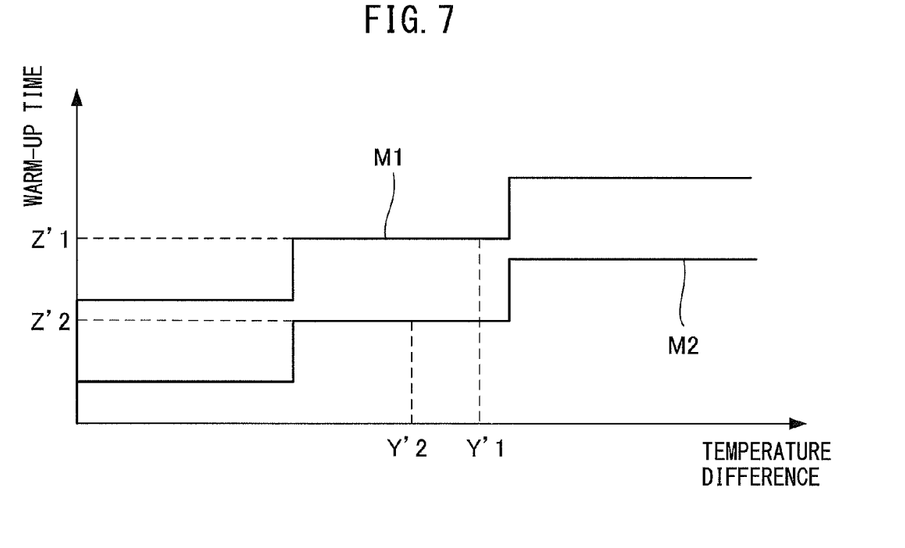
FIG. 7 is a diagram illustrating processing for estimating the warm-up time.

The following will describe the above-described function of the estimating unit 22 of the control unit 20 further in detail with reference to FIGS. 5 to 7. FIG. 5 is a diagram representing the relationship between the temperature and the heat capacity of machines. The horizontal axis of FIG. 5 indicates the operation time when the object machines almost continuously perform operation. The vertical axis indicates the machine temperature. As depicted in FIG. 5, when the machines start operation, the temperature gradually rises at first, and, when the temperature reaches at predetermined temperature (X1 or X2 in FIG. 5), the temperature does not substantially rise any more. The temperature where the temperature does not rise any more is referred to as the saturation temperature X. The saturation temperature X is a value unique to a machine, which is determined according to the heat capacity of the machine.

FIG. 5 depicts examples of a first machine M1 and a second machine M2 for comparison. In the case of FIG. 5, the heat capacity of the first machine M1 is greater than that of the second machine M2. Therefore, the saturation temperature X1 of the first machine M1 has a greater value than the saturation temperature X2 of the second machine M2.

In general, it is difficult to perform a predetermined operation while maintaining the temperature of the machine at a certain target temperature. As such, it is empirically known that the stable operation accuracy of the machine can be obtained by operating the machine in a state where the machine has reached the saturation temperature.

FIGS. 6 and 7 are diagrams illustrating processing for estimating the warm-up time. As exemplified with reference to FIG. 5, the case of the first machine M1 and the second machine M2 will be considered. The horizontal axis of FIGS. 6 and 7 indicates a temperature difference between the experimentally acquired saturation temperature of the machine and the measured temperature of the machine. Further, the vertical axis indicates the warm-up time that it takes to warm-up the machine until the saturation temperature X.

FIG. 6 depicts a case in which the warm-up time is determined in proportion to a temperature difference between the saturation temperature and the measured temperature. For example, when the above-described temperature difference of the first machine M1 is Y1, the corresponding warm-up time Z1 is estimated. In practice, a warm-up time longer than the warm-up time Z1 may be set.

Likewise, when the above-described temperature difference of the second machine M2 is Y2, the corresponding warm-up time Z2 is estimated. Likewise, a warm-up time longer than the warm-up time Z2 may be set. Such a relationship between the temperature difference and the corresponding warm-up time can be stored in the control device 10, included in the operation program, or manually set.

FIG. 7 depicts a case in which, for the temperature difference between the saturation temperature of the machine and the measured temperature of the machine, the corresponding warm-up time is experimentally defined. In other words, the graph of FIG. 7 represents the experimentally defined relationship between the saturation temperature of the machine and the measured temperature of the machine. In FIG. 7, just as illustrated with reference to FIG. 6, the warm-up time is also estimated using the relationship between the temperature differences Y'1 and Y'2 and corresponding Z'1 and Z'2.

Figure 2:
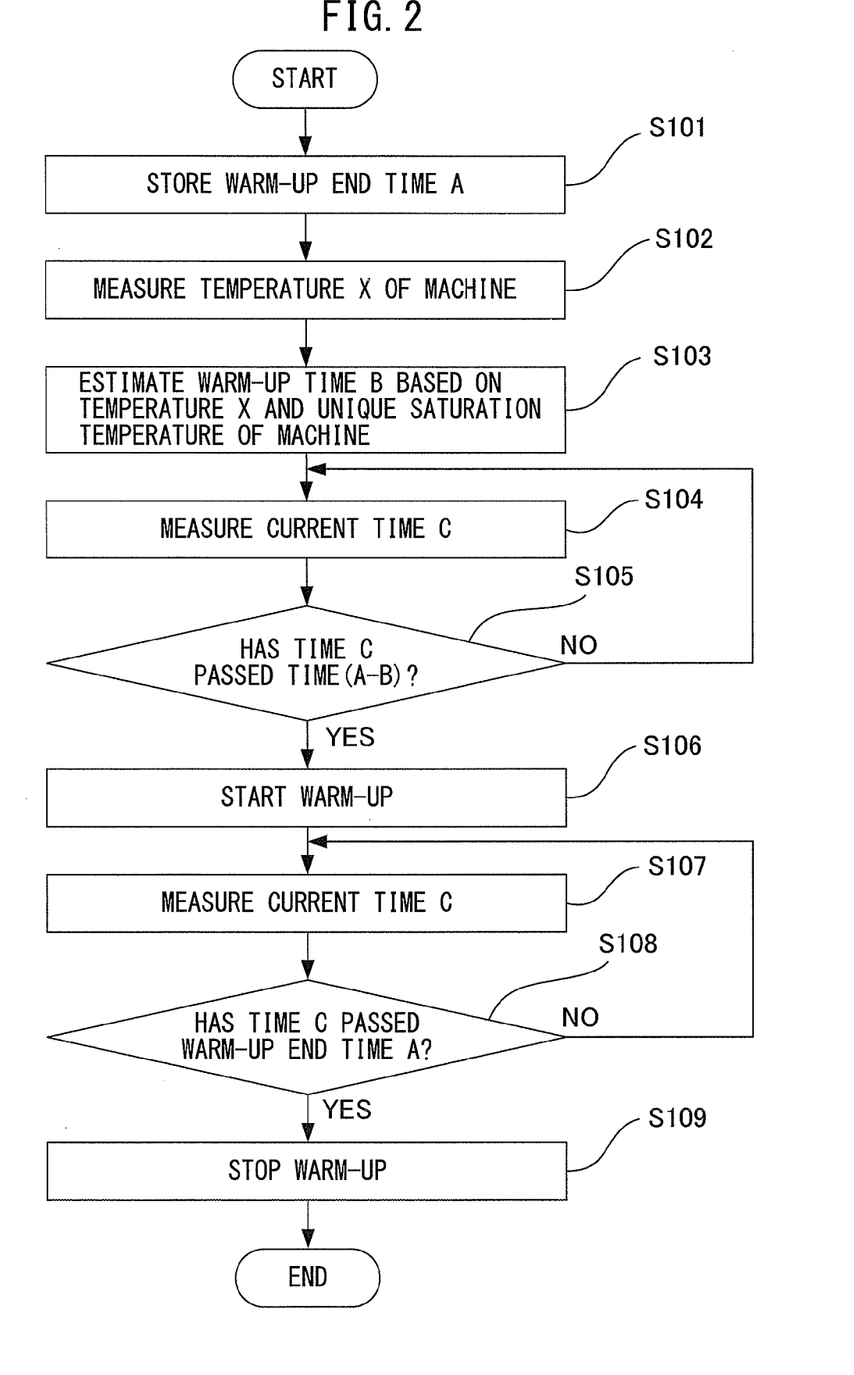
FIG. 2 is a flowchart depicting a flow of processing performed by the control device according to the first embodiment.

Next, with reference to FIG. 2, the processing performed by the control device 10 according to this embodiment will be described. FIG. 2 is a flowchart depicting the flow of the processing performed by the control device 10 that has the above-described configuration.

First, at step S101 as a preparation stage, the warm-up end time A, which is the time when the warm-up should end, is stored in the storage unit 14. The temperature measurement unit 12 is activated and measures the temperature X of the machine (step S102).

Subsequently, the estimating unit 22 of the control unit 20 is activated and estimates the warm-up time B (step S103). As described above, the warm-up time B may be estimated based on the difference between the saturation temperature unique to the machine to be warmed up and the temperature X of the machine measured at step S102. Further, at step S104, the current time C is measured by the time measurement unit 16.

Subsequently, at step S105, whether or not the current time C has passed the warm-up start time is determined. The warm-up start time may be calculated by subtracting the warm-up time B from the warm-up end time A. At step S105, when the current time C is determined to have not reached the warm-up start time, the processing of steps S104 and S105 is repeated.

At step S105, when the current time C is determined to have passed the warm-up start time, the processing proceeds to step S106 to start the warm-up. The warm-up is performed according to a prestored predetermined operation program.

Once the warm-up starts, the current time C is measured by the time measurement unit 16 with a predetermined sampling cycle (step S107). The current time C acquired at step S107 is used, at the next step S108, to determine whether or not the current time C has passed the warm-up end time A stored in the storage unit 14.

At step S108, when the current time C is determined to have not passed the warm-up end time A, the processing of steps S107 and S108 is repeated. At step S108, when the current time C is determined to have passed the warm-up end time A, the processing proceeds to step S109. At step S109, the warm-up end unit 28 is activated and performs the termination processing of the warm-up. As such, the warm-up can be efficiently performed by the predetermined warm-up end time A.

Next, the second embodiment of the present invention will be described. In the following description, the description of the matters redundant to the content that has already been described in relation to the first embodiment will be omitted as necessary. Further, the same reference signs are used for the same or corresponding constituent elements.

Figure 3:
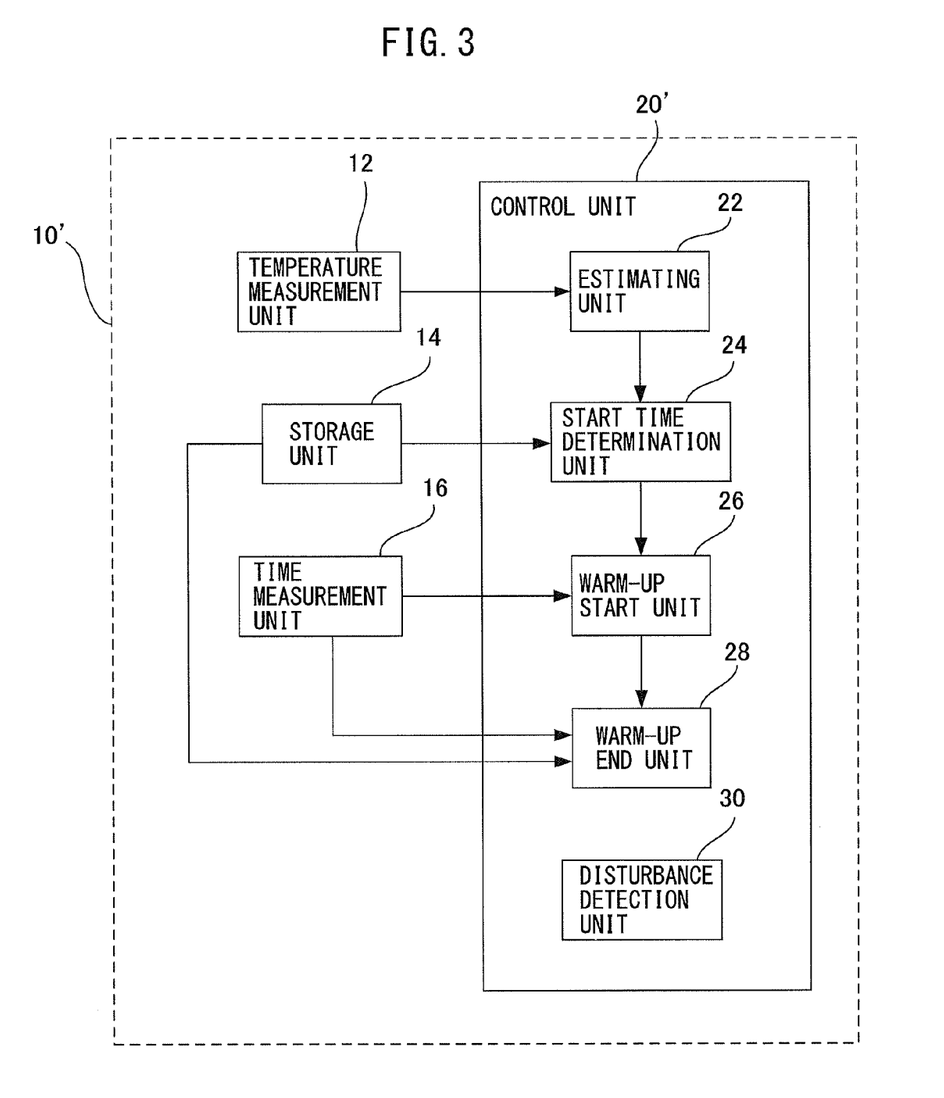
FIG. 3 is a functional block diagram depicting a configuration of a control device according to a second embodiment of the present invention.

FIG. 3 is a functional block diagram depicting a configuration of a control device 10' according to the second embodiment of the present invention. As depicted in FIG. 3, a control unit 20' of the control device 10' further includes a disturbance detection unit 30 in addition to the configuration of the control unit 20 according to the first embodiment.

The disturbance detection unit 30 functions to detect a disturbance that is generated during a warm-up. Examples of the disturbance include a change in the ambient temperature during a warm-up or a temporary halt of the warm-up. As a factor that may cause such a disturbance, for example, when a door for protecting the machine is opened and closed during the warm-up for some reason, may be considered.

When a disturbance is detected by the disturbance detection unit 30, the warm-up can be completed within the predetermined time by changing the operation condition of the warm-up in consideration of the influence of the disturbance. For example, when the operation of the machine temporarily halts, the decreased amount of the temperature of the machine, associated with the halt, is calculated. Then, a speed command to the power system of the machine during the warm-up is multiplied by a certain coefficient that is determined according to the decreased amount of the temperature. In this way, the operation condition during the warm-up can be changed taking the influence of disturbance generation into account. Further, the coefficient may be adjusted in consideration of the ratio of the decreased amount of the temperature with reference to the saturation temperature unique to the machine.

Figure 4:
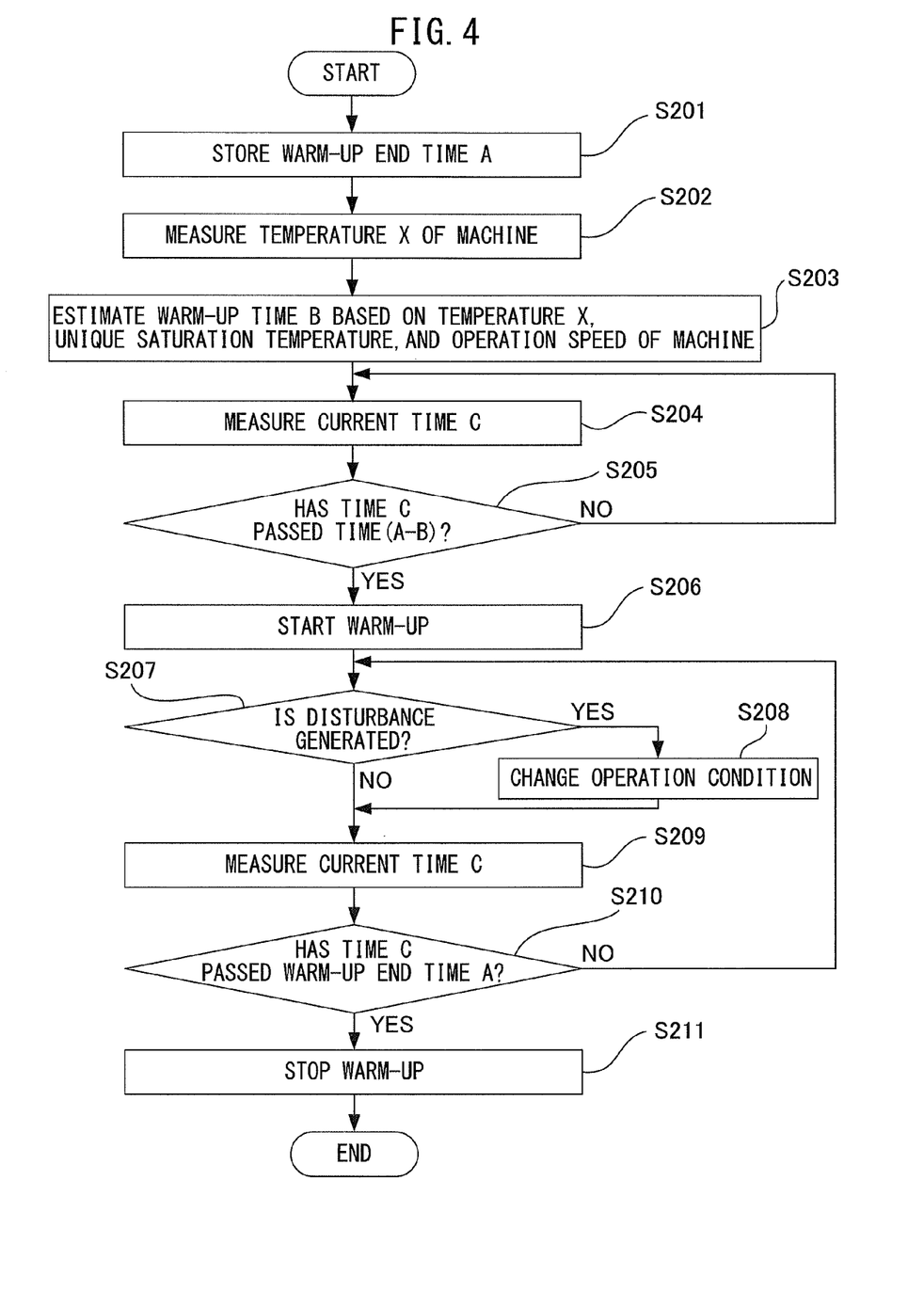
FIG. 4 is a flowchart depicting a flow of processing performed by the control device according to the second embodiment.

FIG. 4 is a flowchart depicting the flow of processing performed by the control device 10' according to the second embodiment. The processing of steps S201, S202, S204 to S206, and S209 to S211 depicted in FIG. 4 are the same as the processing of steps S101, S102, and S104 to S109 as illustrated with reference to FIG. 2. Therefore, only the processing of steps S203, S207, and S208 among steps S201 to S211 depicted in FIG. 4 will be described.

In this embodiment, at step S203, the estimating unit 22 estimates warm-up time B in consideration of the operation condition of the machine during the warm-up, for example, operation speed (including command speed), in addition to the temperature of the machine. In other words, this estimation method additionally takes the correlation between the operation speed of the machine and the warm-up time into account. This estimation method is based on the fact that, as the operation speed increases, the load of the machine (e.g., the equivalent to dynamic friction of the machine and the like) becomes greater, whereby the temperature of the machine rises in shorter time. Then, in such a case, the time that it takes for the warm-up can be shortened.

Thus, the warm-up time that is estimated in the way illustrated with reference to either FIG. 6 or 7 (hereinafter, referred to as the "provisional estimated warm-up time") can be calibrated, for example, by the following numerical formula:

(Provisional estimated warm-up time)×(Reference speed/Operation speed)×Coefficient=(Estimated warm-up time)

As such, the estimated warm-up time that is calibrated in consideration of the operation speed of the machine is calculated. Using such an estimation method, even when the operation speed of the machine during the warm-up is changed from a reference speed, the warm-up time B can be more accurately estimated.

Further, in this embodiment, step S207 for determining whether or not a disturbance is generated is performed after starting the warm-up. The above-described disturbance detection unit 30 detects whether or not a disturbance is generated. When it is determined at step S207 that a disturbance is generated, the processing proceeds to step S208 where the operation condition of the warm-up is changed. The operation condition is selected so that the warm-up can be completed by the warm-up end time A. For example, the operation speed (including command speed) can be changed to compensate the decreased amount of the temperature caused by the disturbance. On the other hand, when it is determined at step S207 that no disturbance is generated, the processing proceeds to steps S209 and S210 in order to determine whether or not the current time C has reached the warm-up end time A.

EFFECT OF THE INVENTION

According to the control device that has the above configuration, the time that it takes for a warm-up is estimated in consideration of the saturation temperature unique to a machine. Then, based on the estimated warm-up time, the warm-up starts so that the warm-up can be completed by the predetermined warm-up end time. Therefore, according to the type or condition of the machine, the optimum warm-up can be automatically performed for the object machine (particularly, drive elements). Further, the expected warm-up can be controlled with a low-cost and simple configuration without a need for preparing additional devices and the like. As a result, the work efficiency is improved and the labor costs for the warm-up can be reduced.

It is apparent to those skilled in the art that, while the above description illustrates a variety of embodiments and modifications of the present invention, the intended effects of the present invention can also be provided by other embodiments or modifications thereof. In particular, the constituent elements of the above-described embodiments and modifications can be eliminated or replaced and known means may be further added without departing from the scope of the present invention. Further, it is also apparent to those skilled in the art that the present invention can be implemented by arbitrarily combining the features of the plurality of embodiments that are implicitly or explicitly disclosed herein.

What is claimed is:

1. A control device that controls a warm-up of a machine in accordance with an operation program, the control device comprising:
a storage unit that stores warm-up end time;
a time measurement unit that measures current time;
a temperature measurement unit that measures temperature of the machine; and
a control unit that controls operation of the machine, the control unit comprising:
an estimating unit that estimates warm-up time that it takes for the warm-up of the machine based on a difference between the temperature of the machine that is measured by the temperature measurement unit and saturation temperature that is unique to the machine;
a start time determination unit that determines warm-up start time by subtracting the warm-up time estimated by the estimating unit from the warm-up end time stored in the storage unit;
a warm-up start unit that starts the warm-up of the machine based on the current time measured by the time measurement unit and the warm-up start time determined by the start time determination unit; and
a warm-up end unit that ends the warm-up of the machine when the current time measured by the time measurement unit coincides with the warm-up end time stored in the storage unit.

2. The control device according to claim 1, wherein the warm-up start unit is configured to start the warm-up of the machine when the current time measured by the time measurement unit coincides with the warm-up start time determined by the start time determination unit.

3. The control device according to claim 1, wherein the estimating unit is configured to calibrate the warm-up time in accordance with an operation speed of the machine.

4. The control device according to claim 1, wherein the control unit further comprises a disturbance detection unit that detects generation of a disturbance, and the control unit is configured to change an operation condition of the machine when the disturbance detection unit detects a disturbance, so that an influence of the disturbance is compensated and the warm-up of the machine is completed by the warm-up end time.

* * * * *